US010503213B2

(12) United States Patent
Kass et al.

(10) Patent No.: US 10,503,213 B2
(45) Date of Patent: Dec. 10, 2019

(54) REMOTE CONTROL DEVICE

(71) Applicant: Hunter Douglas Inc., Pearl River, NY (US)

(72) Inventors: Ronald R. Kass, New York, NY (US);
Douglas J. Barr, Broomfield, CO (US);
Joseph E. Kovach, Brighton, CO (US);
Kevin M. Dann, Englewood, CO (US);
David J. Parrett, Louisville, CO (US);
Clark Brace, Westminster, CO (US);
Fred Bould, Menlo Park, CA (US);
Jaime Caso, Redwood City, CA (US);
Jeremy Wolf, San Mateo, CA (US)

(73) Assignee: Hunter Douglas Inc., Pearl River, NY (US)

( * ) Notice: Subject to any disclaimer, the term of this patent is extended or adjusted under 35 U.S.C. 154(b) by 0 days.

(21) Appl. No.: 16/199,355

(22) Filed: Nov. 26, 2018

(65) Prior Publication Data

US 2019/0094915 A1  Mar. 28, 2019

Related U.S. Application Data

(63) Continuation of application No. 15/016,881, filed on Feb. 5, 2016, now Pat. No. 10,168,744.

(60) Provisional application No. 62/115,947, filed on Feb. 13, 2015.

(51) Int. Cl.
*G06F 1/16* (2006.01)

(52) U.S. Cl.
CPC .................. *G06F 1/1656* (2013.01)

(58) Field of Classification Search
CPC . G06F 1/1656; G06F 3/021; H01H 2231/032; H01H 9/0235; H01H 2223/048; H01H 2229/022; H04N 2005/4432
See application file for complete search history.

(56) References Cited

U.S. PATENT DOCUMENTS

| D197,466 S | 2/1964 | Spilman |
| D219,028 S | 10/1970 | Miller et al. |
| D253,786 S | 12/1979 | Montague |
| D268,601 S | 4/1983 | Lee |
| 5,388,692 A | 2/1995 | Withrow et al. |
| 5,458,311 A | 10/1995 | Holbrook |
| D369,606 S | 5/1996 | Marks |

(Continued)

FOREIGN PATENT DOCUMENTS

| AU | 201515277 | 5/2016 |
| BR | 3020150038217 | 9/2016 |

(Continued)

OTHER PUBLICATIONS

Author Unknown, Belkin Conserve Switch—Energy Saving Surge With Remote (F7C01008q), Obtained at url: http://www.amazon.com/Belkin-Conserve-Switch-Energy-Saving-Protector/dp/B003P2UMNK on Oct. 30, 2014. pp. 1-6.

(Continued)

*Primary Examiner* — Kabir A Timory

(57) ABSTRACT

A remote control device and a method of assembly are provided. The remote control device may include a control unit and a holder. The holder may define a cavity that opens through a surface of the holder. The control unit may be seated in the cavity through the opening in the surface of the holder and recessed relative to the surface of the holder.

18 Claims, 12 Drawing Sheets

(56) References Cited

U.S. PATENT DOCUMENTS

| | | | |
|---|---|---|---|
| D371,792 S | 7/1996 | Patton | |
| D375,909 S | 11/1996 | Dziersk et al. | |
| D379,456 S | 5/1997 | Osiecki | |
| D410,232 S | 5/1999 | Yang | |
| 6,478,316 B1 | 11/2002 | Wagner | |
| D478,571 S | 8/2003 | Solland | |
| D487,454 S | 3/2004 | Wang et al. | |
| D488,994 S | 4/2004 | Hansen | |
| D490,787 S | 6/2004 | Aisenberg | |
| D497,098 S | 10/2004 | Magnusson | |
| D505,417 S | 5/2005 | Wang et al. | |
| D506,120 S | 6/2005 | Straka, Jr. et al. | |
| D510,208 S | 10/2005 | Klimas | |
| D518,030 S | 3/2006 | Lin | |
| D519,823 S | 5/2006 | Pickar et al. | |
| D526,966 S | 8/2006 | Chen | |
| D526,973 S | 8/2006 | Gates et al. | |
| D531,484 S | 11/2006 | Downing | |
| D533,513 S | 12/2006 | Marchetto et al. | |
| D536,665 S | 2/2007 | Solland | |
| D537,321 S | 2/2007 | Paige et al. | |
| D542,234 S | 5/2007 | Shimizu | |
| D546,165 S | 7/2007 | Paige et al. | |
| D550,633 S | 9/2007 | Gupta | |
| 7,298,311 B2 | 11/2007 | Horie et al. | |
| D556,538 S | 12/2007 | Weinerman et al. | |
| D561,113 S | 2/2008 | Samhammer et al. | |
| D567,061 S | 4/2008 | Paige et al. | |
| D575,816 S | 8/2008 | Law et al. | |
| D578,373 S | 10/2008 | Paige et al. | |
| D586,331 S | 2/2009 | Francz et al. | |
| D595,670 S | 7/2009 | Glassman et al. | |
| D602,916 S | 10/2009 | Won et al. | |
| D604,271 S | 11/2009 | Lewis et al. | |
| D612,850 S | 3/2010 | Cabatic | |
| D619,121 S | 7/2010 | Feldstein et al. | |
| D643,412 S | 8/2011 | Brady et al. | |
| 8,138,942 B2 | 3/2012 | Otsuka et al. | |
| 8,188,842 B2 | 5/2012 | Otsuka et al. | |
| D670,043 S | 10/2012 | Goldman | |
| 8,330,638 B2 | 12/2012 | Altonen et al. | |
| 8,389,857 B2 | 3/2013 | Petrillo | |
| 8,508,148 B1 | 8/2013 | Carley et al. | |
| D693,332 S | 11/2013 | Lee et al. | |
| D700,904 S | 3/2014 | Miller et al. | |
| 8,695,934 B2 | 4/2014 | Jensen | |
| D724,060 S | 3/2015 | Ahn et al. | |
| 9,030,833 B2 | 5/2015 | Charleux | |
| D738,355 S | 9/2015 | Smith et al. | |
| D746,266 S | 12/2015 | Kwon et al. | |
| D756,953 S | 5/2016 | Zhang | |
| D758,325 S | 6/2016 | Cook et al. | |
| D769,227 S | 10/2016 | Kass et al. | |
| 2005/0279661 A1* | 12/2005 | Hodges ............... H01H 9/0242 206/320 | |
| 2007/0241929 A1 | 10/2007 | Marchetto | |
| 2008/0247125 A1 | 10/2008 | Davenport et al. | |
| 2009/0121905 A1 | 5/2009 | Griffin, Jr. et al. | |
| 2009/0267897 A1 | 10/2009 | Ootsuka | |
| 2010/0053464 A1 | 3/2010 | Otsuka | |
| 2010/0123062 A1 | 5/2010 | Jones et al. | |
| 2011/0221622 A1 | 9/2011 | West et al. | |
| 2012/0056726 A1 | 3/2012 | Paul | |
| 2014/0117871 A1 | 5/2014 | Swatsky et al. | |

FOREIGN PATENT DOCUMENTS

| | | |
|---|---|---|
| CA | 150730 S | 2/2014 |
| CA | 150731 S | 2/2014 |
| CA | 150732 S | 2/2014 |
| CA | 150733 S | 2/2014 |
| CN | 101843431 A | 9/2010 |
| CN | 203432031 U | 2/2014 |
| CN | 203686528 U | 7/2014 |
| CN | ZL201530303413.2 S | 4/2016 |
| DE | 202004016716 U1 | 2/2005 |
| EM | 000047451-0002 | 6/2003 |
| EM | 000047451-0004 | 6/2003 |
| EM | 000053046-0005 | 7/2003 |
| EM | 000359591-0001 | 8/2005 |
| EM | 000359591-0002 | 8/2005 |
| EM | 000359591-0003 | 8/2005 |
| EM | 000359591-0004 | 8/2005 |
| EM | 000359591-0005 | 8/2005 |
| EM | 000359591-0006 | 8/2005 |
| EM | 000359591-0007 | 8/2005 |
| EM | 000359591-0008 | 8/2005 |
| EM | 000359591-0009 | 8/2005 |
| EM | 000359591-0010 | 8/2005 |
| EM | 000359591-0011 | 8/2005 |
| EM | 000359591-0012 | 8/2005 |
| EM | 000359591-0013 | 8/2005 |
| EM | 000359591-0014 | 8/2005 |
| EM | 000359591-0015 | 8/2005 |
| EM | 000359591-0016 | 8/2005 |
| EM | 000359591-0017 | 8/2005 |
| EM | 002190496-0001 | 3/2013 |
| EM | 002745323-0001 | 7/2015 |
| EM | 002745422-0001 | 7/2015 |
| EM | 002743450-0001 | 7/2017 |
| EP | 0458480 A2 | 11/1991 |
| EP | 1831905 B1 | 6/2011 |
| JP | 8102986 A | 4/1996 |
| JP | 2009152945 A | 7/2009 |
| JP | 201449917 A | 3/2014 |
| KR | 300848756-0001 | 4/2016 |
| KR | 300848756-0002 | 4/2016 |
| KR | 300848756-0003 | 6/2016 |
| KR | 300848756-0004 | 6/2016 |
| WO | DM 058 062 | 9/2001 |
| WO | DM 073 527 | 4/2010 |
| WO | WO201095069 A1 | 8/2010 |
| WO | DM 073 994 | 9/2010 |
| WO | DM 074 389 | 9/2010 |

OTHER PUBLICATIONS

Author Unknown, GROHE America, Inc. Rainshower® F-Series Digital Controller, Obtained at url: http://www.grohe.com/us/5751/showers/shower-heads-body-sprays/rainshower-fseries-head-side-showers/ on Oct. 15, 2014. pp. 1-2.

* cited by examiner

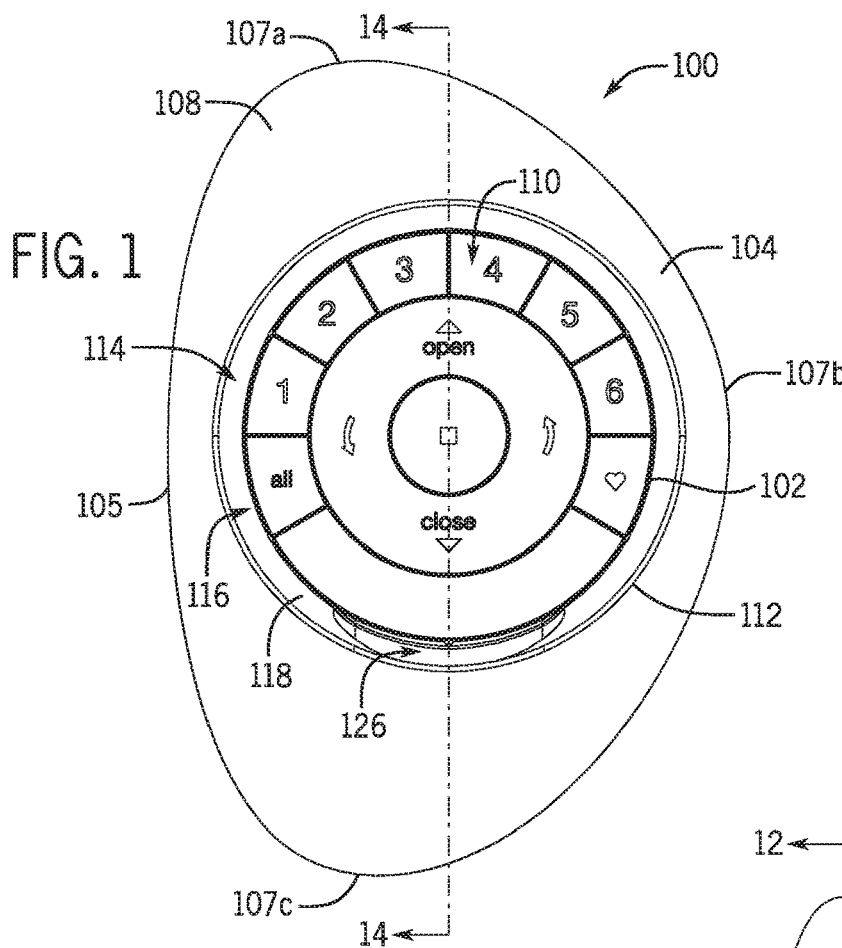
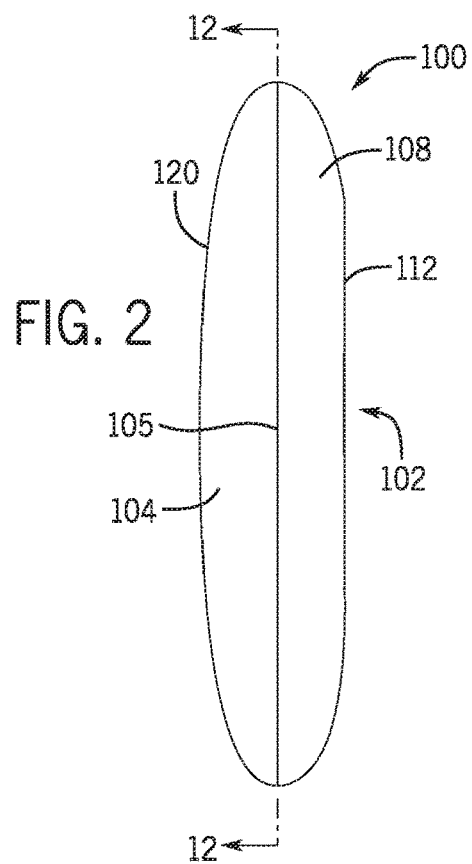

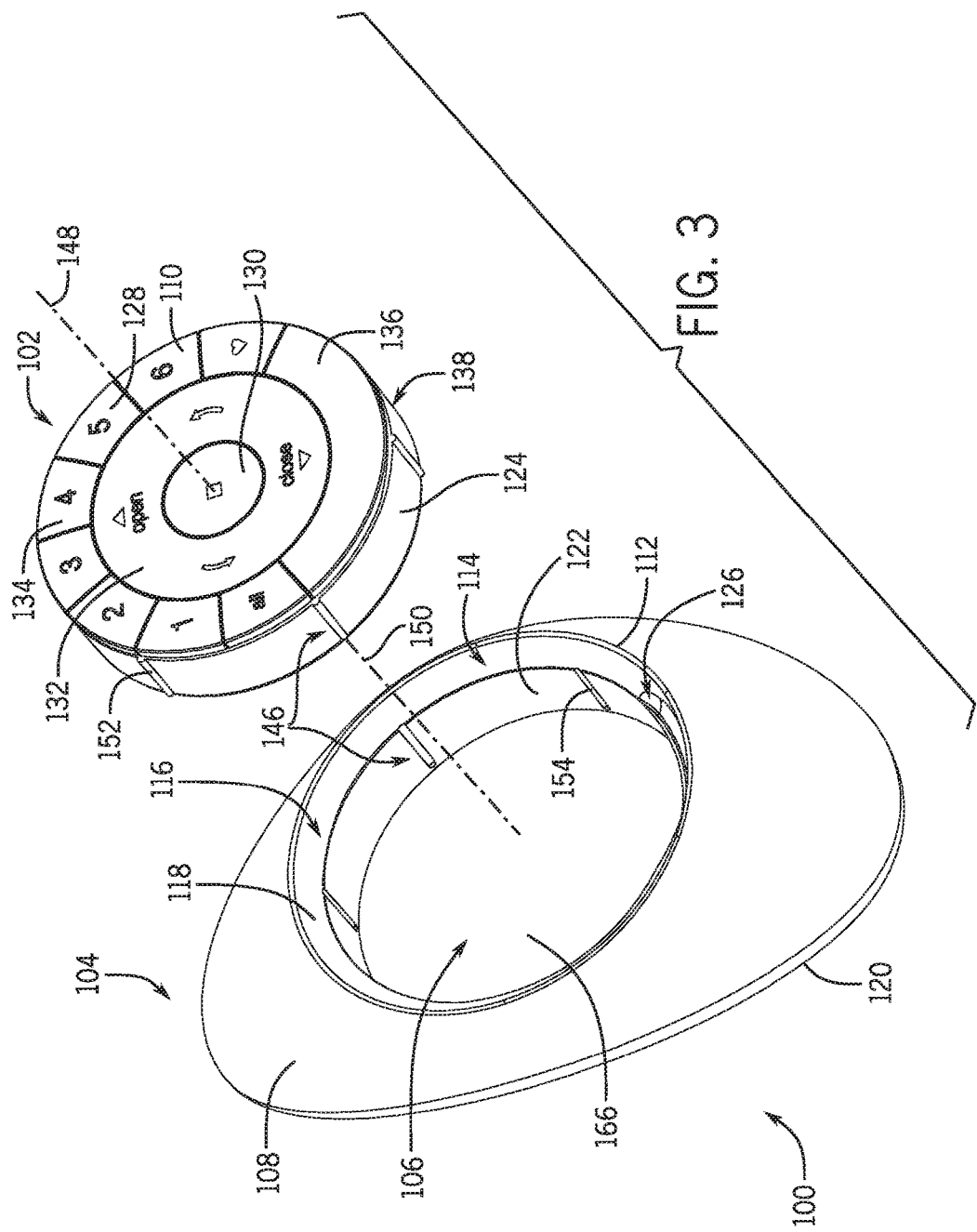

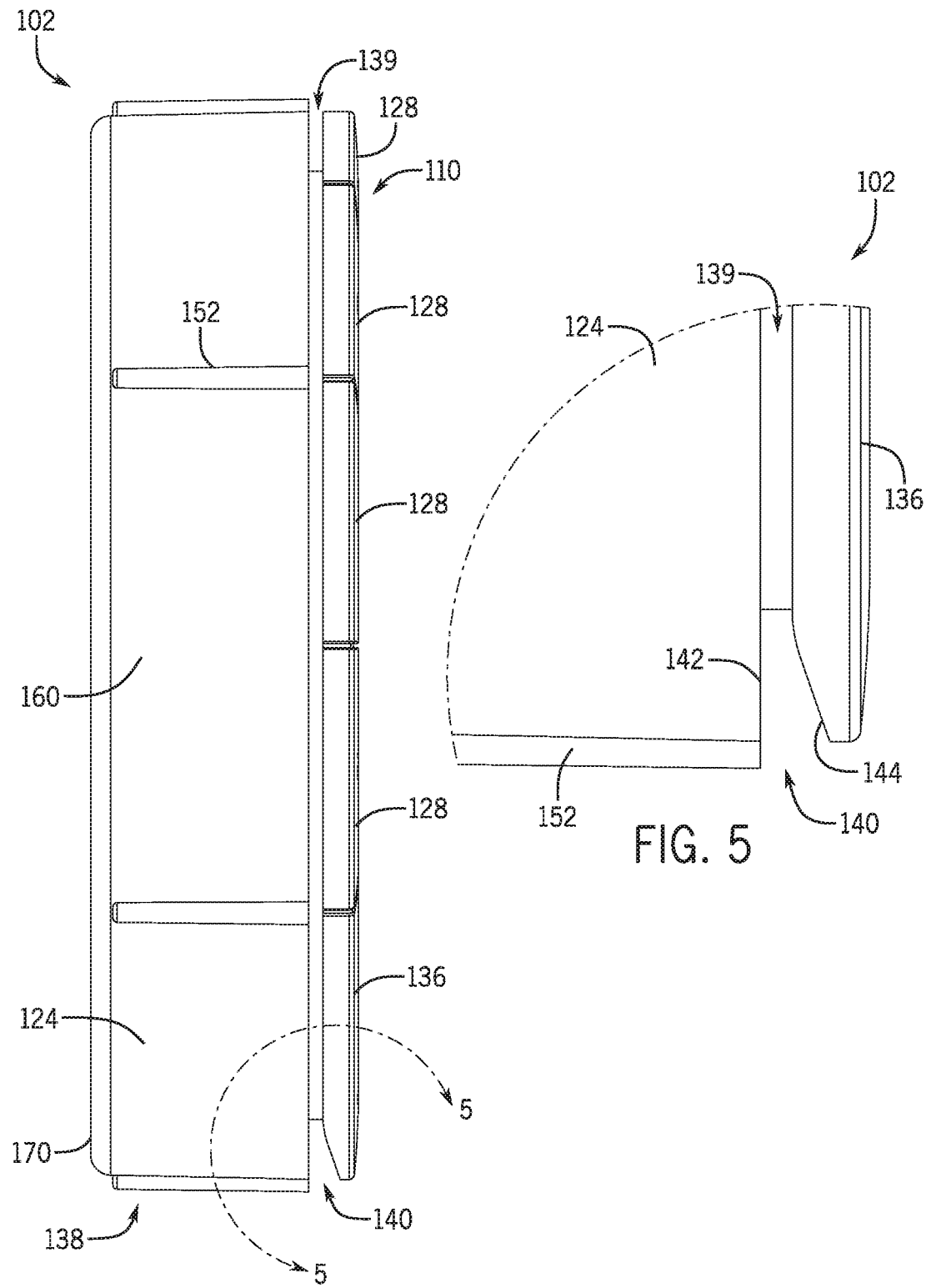

REMOTE CONTROL DEVICE

CROSS-REFERENCE TO RELATED APPLICATIONS

This application is a continuation of co-pending U.S. patent application Ser. No. 15/016,881, filed Feb. 5, 2016, entitled "Remote Control Device", which application claims the benefit under 35 U.S.C. § 119(e) of the filing date of U.S. provisional patent application No. 62/115,947, filed Feb. 13, 2015, and entitled "Remote Control Device," which applications are hereby incorporated herein in their entirety.

FIELD

The present disclosure relates generally to a remote control device, and more particularly to a remote control device including a holder and a removable control unit.

BACKGROUND

Automated systems for the home, such as gates, shutters, blinds, awnings, and access doors, have become widespread. These automated systems typically are equipped with remote control devices that control operation of the automated systems by electromagnetic radiation, such as infrared radiation or radio waves. Sometimes a user may wish to change the aesthetics, ergonomics, or functionality of a remote control device, such as the shape or user interface of the remote control device, without replacing the entire remote control device.

SUMMARY

Embodiments of the disclosure may include a remote control device for operating an electronic device. In some embodiments, the remote control device may include a control unit, a holder, or a combination of a control unit and a holder. The holder may define a cavity that opens through a surface of the holder. The control unit may be seated in the cavity through the opening in the surface of the holder and may be recessed relative to the surface of the holder, such as to protect the control unit from inadvertent or undesired contact.

The holder may define an access feature in the surface of the holder that facilitates removal of the control unit from the holder. The access feature may be a recessed area that extends at least partially around a periphery of the control unit. The recessed area may include a notch that extends around a portion of the periphery of the control unit. The control unit may include an engagement feature arranged along an outer portion of a user interface of the control unit, and the engagement feature may be aligned with the notch to facilitate removal of the control unit from the holder. The engagement feature may at least partially define a recess aligned with the notch to facilitate removal of the control unit from the holder. The recessed area may be defined by a recessed surface that extends around the entire periphery of the control unit. The holder may define a rim extending around the control unit, and the recessed surface may extend rearwardly from the rim towards a rear surface of the holder. The recessed surface may extend inwardly from the rim towards a side wall of the control unit. The notch may be defined in the recessed surface.

The control unit and the holder may include corresponding retention features for retaining the control unit in the cavity of the holder. The control unit may include either multiple ribs or multiple grooves formed in a side wall of the control unit, and the either multiple ribs or multiple grooves may extend lengthwise along a longitudinal axis of the control unit. The holder may include the other of the either multiple ribs or multiple grooves, and the other of the either multiple ribs or multiple grooves may be formed in a side wall of the holder that defines the cavity, and extend lengthwise along a longitudinal axis of the cavity. The multiple ribs may have a narrower width than the multiple grooves.

The remote control device may include a wall mount that is removably attachable to the holder. The wall mount may include a body and a pair of ears projecting radially outwardly from the body. The holder may define a pair of channels for receiving the pair of ears. The holder may include an inner wall that defines a bottom of the cavity. The holder may include an inner wall formed as a rim that defines a bottom seat for the control unit.

In some embodiments, the remote control device may include a holder defining a cavity opening through a surface of the holder for receiving a control unit of the remote control device, the holder further defining an access feature in the surface of the holder that facilitates removal of the control unit from the holder. The access feature may be a recessed area that extends at least partially around a periphery of the cavity. The recessed area may include a notch that extends around a portion of the periphery of the cavity. The recessed area may be defined by a recessed surface that extends around the entire periphery of the cavity. The holder may define a rim extending around the cavity, and the recessed surface may extend rearwardly from the rim towards a rear surface of the holder. The recessed surface may extend inwardly from the rim towards a side wall of the holder that at least partially defines the cavity. The notch may be defined in the recessed surface. The holder may define multiple grooves formed in a side wall of the holder that at least partially defines the cavity, and the multiple grooves may extend lengthwise along a longitudinal axis of the cavity. The holder may include an inner wall that defines a bottom of the cavity. The holder may include an inner wall formed as a rim that defines a bottom seat for the control unit.

Embodiments of the disclosure may include a method of assembling a remote control device. In some embodiments, the method includes positioning a control unit forwardly of a cavity that opens through a surface of a holder; aligning a longitudinal axis of the control unit with a longitudinal axis of the cavity; aligning multiple retention features of the control unit with multiple corresponding retention features of the holder, the multiple retention features of the control unit extending lengthwise along the longitudinal axis of the control unit, and the multiple corresponding retention features of the holder extending lengthwise along the longitudinal axis of the holder; and inserting the control unit into the cavity by moving the control unit toward the holder along the longitudinal axis of the holder such that the multiple retention features of the control unit engage the multiple corresponding retention features of the holder.

Inserting the control unit into the cavity may include inserting the control unit into the cavity until the control unit is recessed relative to the surface of the holder. The method may include aligning an engagement feature of the control unit with a notch formed in the holder prior to inserting the control unit into the cavity. The multiple retention features of the control unit may be ribs projecting outwardly from a side wall of the control unit and spaced apart from one another around the side wall. The corresponding retention features of the holder may be grooves formed in a side wall defining the cavity and spaced apart from one another around the side wall. The method may include attaching the holder to a wall mount. Attaching the holder to the wall mount may include aligning a pair of channels defined in the holder with a pair of ears projecting radially outwardly from a body of the wall mount, inserting the pair of ears through the pair of channels, and rotating the holder relative to the wall mount. The method may include abutting the control unit against an inner wall of the holder.

Embodiments of the disclosure may include a method of orienting a remote control device. The method may include placing a single, unitary holder face up on a support surface so that a rear surface of the holder contacts the support surface and a control unit received in the holder is accessible through a front surface of the holder. The method may further include orienting the holder face down on the support surface so that a front surface of the holder contacts the support surface and the control unit is spaced apart from the support surface and does not contact the support surface. The control unit may be removably received in the holder through an opening formed in the front surface of the holder.

Embodiments of the disclosure may include a method of interchanging the mounting of a remote control device. The method may include placing a control unit of the remote control device in one of a plurality of holders, removing the control unit from the one of the plurality of holders, and placing the control unit in another of a plurality of holders. The plurality of holders may include a first holder configured for mounting on a first support surface, and a second holder configured for being supported by, without being attached to, a second support surface. The second holder may have a cavity opening through a front face thereof for receiving the control unit, and the cavity depth may be set so that a front face of the control unit is recessed relative to the front face of the holder so that upon resting the front face of the second holder on the second support surface, the front face of the control unit is spaced above and out of contact with the second support surface.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular embodiments or arrangements illustrated herein.

BRIEF DESCRIPTION OF THE DRAWINGS

The accompanying drawings, which are incorporated into and constitute a part of the specification, illustrate embodiments of the disclosure and, together with the general description given above and the detailed description given below, serve to explain the principles of these embodiments.

FIG. 1 is front view of a remote control device in accordance with some embodiments of the present disclosure.

FIG. 2 is a left side view of the remote control device of FIG. 1 in accordance with some embodiments of the present disclosure.

FIG. 3 is an exploded, front isometric view of the remote control device of FIG. 1 in accordance with some embodiments of the present disclosure.

FIG. 4 is a left side view of a control unit of the remote control device of FIG. 1 in accordance with some embodiments of the present disclosure.

FIG. 5 is an enlarged, detail view of an access feature of the control unit of FIG. 4 taken along line 5-5 of FIG. 4 in accordance with some embodiments of the present disclosure.

DETAILED DESCRIPTION

Figure 6:
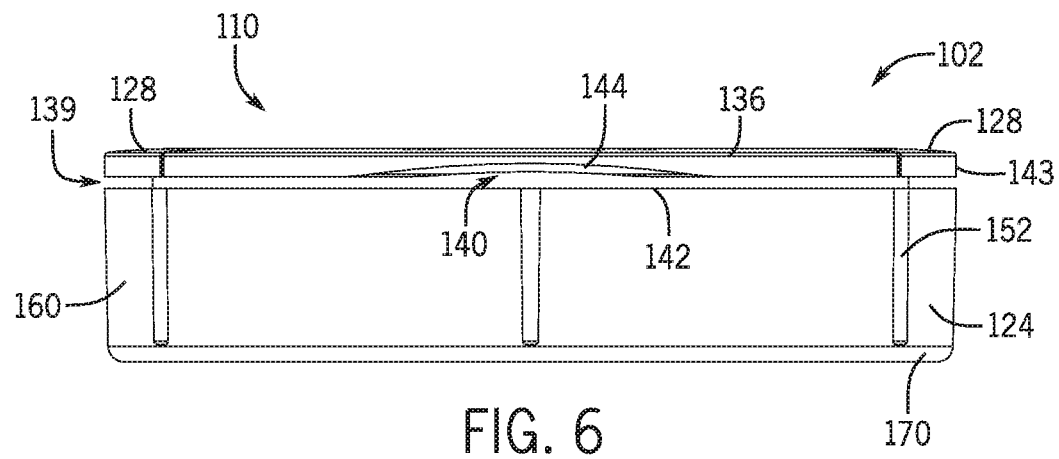
FIG. 6 is a bottom view of the control unit of FIG. 4 in accordance with some embodiments of the present disclosure.
Figure 7:
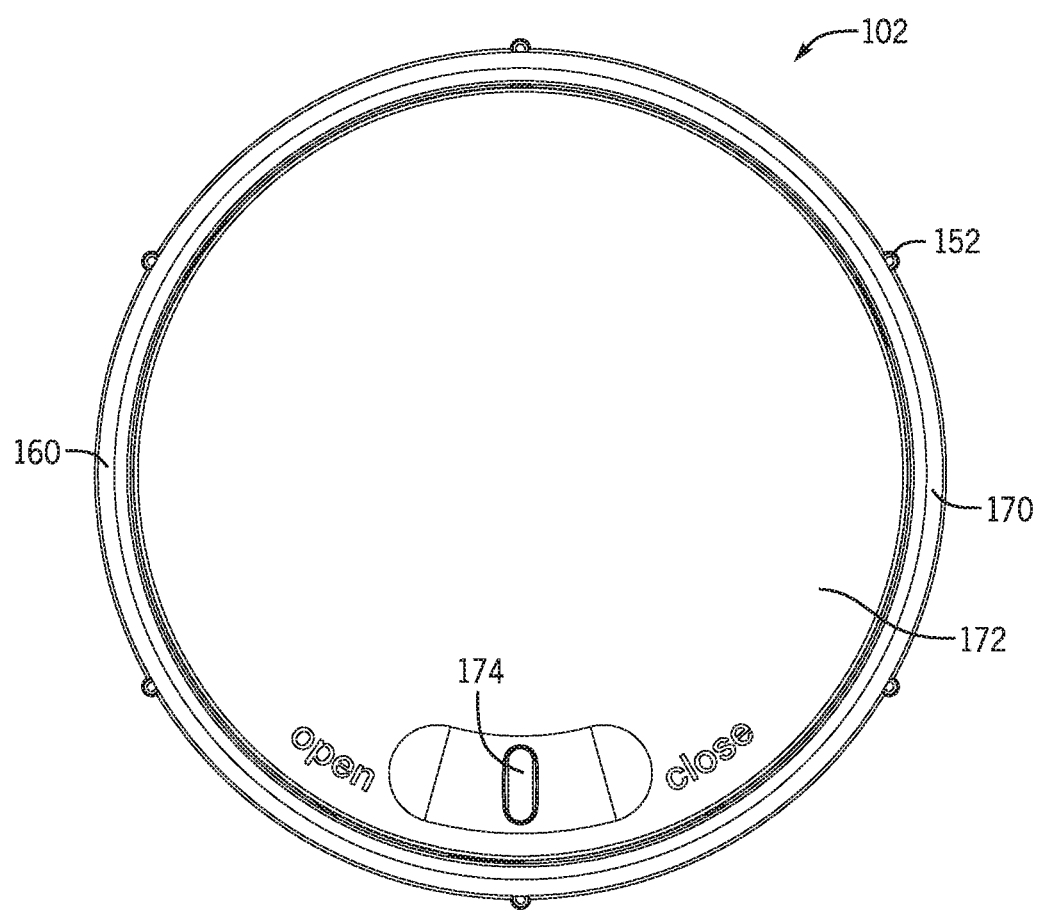
FIG. 7 is a rear view of the control unit of FIG. 4 in accordance with some embodiments of the present disclosure.
Figure 8:
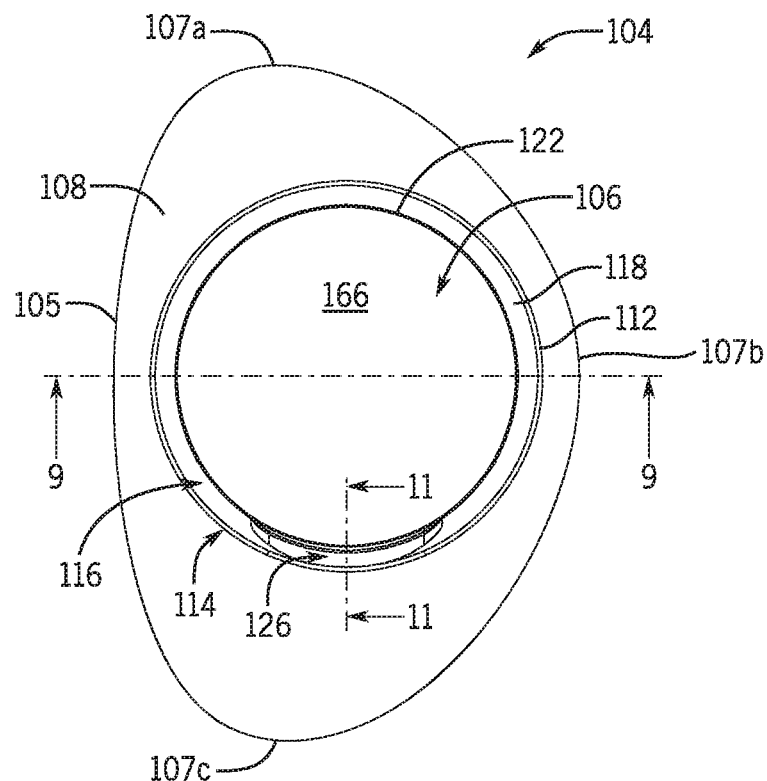
FIG. 8 is a front view of a holder of the remote control device of FIG. 1 in accordance with some embodiments of the present disclosure.
Figure 9:
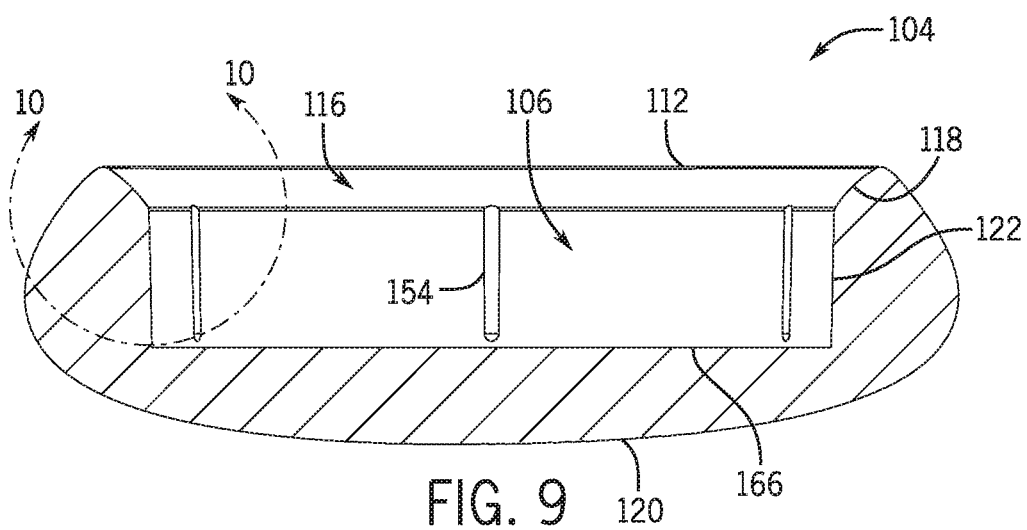
FIG. 9 is a cross-sectional view of the holder of FIG. 8 taken along line 9-9 of FIG. 8 in accordance with some embodiments of the present disclosure.
Figure 10:
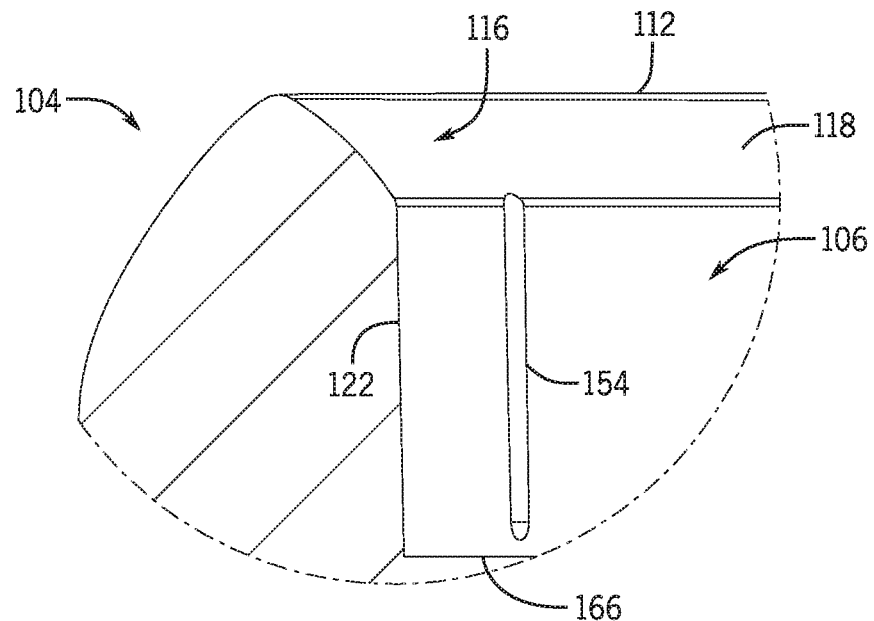
FIG. 10 is an enlarged, detail view, taken along line 10-10 of FIG. 9, of a retention feature formed in an internal wall of the holder of FIG. 8 in accordance with some embodiments of the present disclosure.
Figure 11:
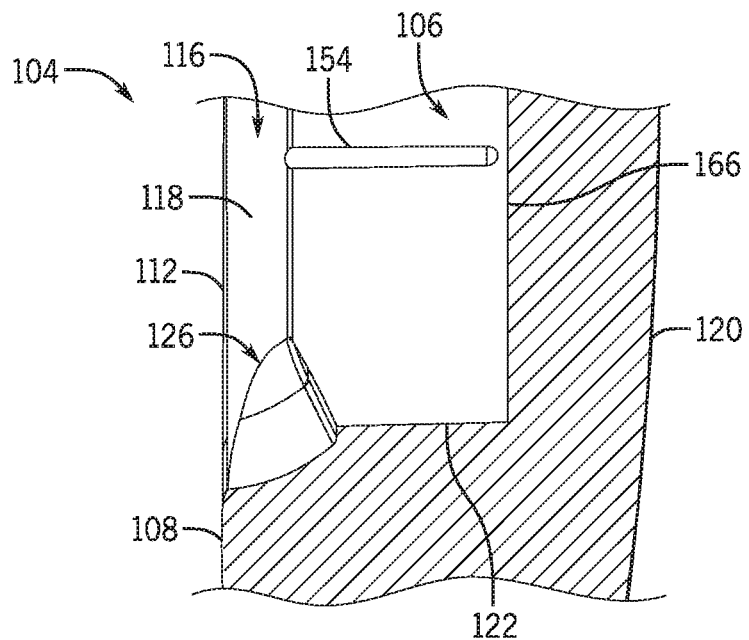
FIG. 11 is a fragmentary, cross-sectional view of the holder of FIG. 8 taken along line 11-11 of FIG. 8 in accordance with some embodiments of the present disclosure.

The present disclosure generally provides a remote control device including a control unit and one or more holders for the control unit. The control unit may form a stand-alone electronic module or unit that incorporates all of the functions and components needed to operate or control the operation of an electronic device. In some embodiments, the control unit includes a power supply (such as one or more batteries), a communication circuit (such as a receiving circuit, a transmission circuit, or both) for communicating with the electronic device (such as by radio waves, infrared, or other suitable transmission methods), a user interface (such as an electronic display, one or more depressible buttons, or both), and a body for housing at least some of the components of the control unit.

The control unit and the one or more holders may be separate, distinct components. The control unit may be interchangeably seated in various different holders. The holders may differ from one another in various aspects, such as aesthetics and/or function. In some embodiments, one or more holders are configured to support the control unit on a substantially horizontal support surface, such as a countertop, a tabletop, a floor, or the like. In some embodiments, one or more holders are configured to attach or secure the control unit to a substantially vertical support surface, such as a wall. A single control unit may be removably received within an assortment of different holders.

The holders may each include a body defining a cavity or recess that opens through a surface of the body. The body may include one or more internal side walls and an internal end wall defining the cavity. In some embodiments, the internal end wall projects inwardly from the one or more internal side walls and defines a closed bottom of the cavity such that the cavity includes a closed end associated with a rear side of the holder and an open end associated with a front side of the holder. In some embodiments, the internal end wall projects inwardly from the one or more internal side walls and defines an open bottom of the cavity. In these embodiments, the cavity is formed as a through-hole extending through the holder, and the internal end wall functions as an abutment wall for the control unit.

When seated in a holder, the control unit may be recessed into the holder to protect the control unit, particularly the front face of the control unit, from damage or inadvertent activation regardless of the orientation of the holder. For example, a user may place the holder upside down to conceal the control unit from view without damaging or activating the control unit. The holder may surround the side surfaces of the control unit such that the control unit is concealed when viewing the remote control device from the side. In some embodiments, the holder also encloses a rear surface of the control unit such that only a front surface of the control unit is accessible when the control unit is seated in the holder. In some embodiments, the holder is configured to be supported face down to hide the working surface of the control unit, and the remote control device may blend into its environment and appear to be an ornamental object, rather than a remote control device.

The recessed nature of the control unit may make it difficult to remove the control unit from the holder. The control unit, the holder, or both may include one or more access, removal, or surface features to facilitate removal of the control unit from the holder. In some embodiments, the holder includes a recessed area that extends at least partially along a perimeter or other portion of the control unit to enable a user to engage the control unit and remove the control unit from the holder. In some embodiments, the control unit may include a surface feature, such as a protrusion or recess, associated with a perimeter of the control unit to assist in removing the control unit from the holder. The surface feature of the control unit may be accessible via the recessed area of the holder when the control unit is seated in the holder.

The recessed area of the holder may surround the cavity defined in the holder. The recessed area may include a first portion that surrounds the control unit and a second portion formed in the first portion. The first portion may be formed by a chamfered or other suitable surface surrounding the cavity of the holder. The second portion may extend rearwardly from the first portion toward the internal end wall of the holder to provide additional access to a portion of the control unit, such as a side wall of the control unit. When the control unit is seated in the holder, the surface feature of the control unit may correspond to the second portion of the recessed area of the holder to facilitate removal of the control unit from the holder.

Referring to FIGS. 1-3, a remote control device 100 may include a control unit 102 and a holder or support 104. The control unit 102 may be removably seated in the holder 104. When seated in the holder 104, the control unit 102 may be surrounded on its side and rear surfaces by the holder 104. In some embodiments, the holder 104 defines a cavity 106 that opens through a front surface 108 of the holder 104, and the control unit 102 is removably seated in the cavity 106. The control unit 102, including its user interface 110, may be recessed relative to the front surface 108 of the holder 104 when seated in the cavity 106 (see FIGS. 1-3, 14, and 15). The recessed nature of the control unit 102 relative to the holder 104 may enable a user to position the remote control device 100 in any orientation, such as upside down, on a support surface without damaging or inadvertently engaging the control unit 102 or user interface 110.

Recessing the control unit 102 relative to the holder 104 may provide a user with many aesthetic options. For example, when the remote control device 100 is oriented upside-down, the holder 104 may conceal the control unit 102 from view such that the control unit 102 does not detract from the aesthetics or décor of the associated room. In this upside-down orientation, the exterior shape or configuration of the holder 104 is visible to the user, and different holders may be formed in different exterior shapes or configurations to suit the aesthetic preferences of the user. In some embodiments, the front surface 108 of the holder 104 defines a rim 112 that extends forwardly of the user interface 110 of the control unit 102. When the holder 104 is positioned upside down, the rim 112 may abut against a support surface, thereby offsetting the user interface 110 from the support surface to protect the user interface 110 from damage, inadvertent activation, or both.

The holder 104 may be formed in various configurations to provide the user with many aesthetic options. In some embodiments, an assortment of holders 104 are provided with various shapes, such as a triangular shape with rounded edges, a cylindrical or ring shape, or other asymmetrical or symmetrical shapes, to provide the user with many aesthetic options. In some embodiments, an assortment of holders 104 are provided that are constructed from various materials, including metallic and/or non-metallic materials, which may be man-made or natural. In some embodiments, an assortment of holders 104 are formed of a polymeric material, such as acrylonitrile butadiene styrene (ABS) or Surlyn (a copolymer of ethylene and methacrylic acid), some of which may be plated (e.g., with a vacuum metallized nickel plating). In some embodiments, an assortment of holders 104 are provided with different finishes, such as a MT-11005 surface texture, a brushed texture (e.g., a concentric hairline brush), a polish (e.g., a 6000-grit ultra-fine polish), a coating (e.g., a matte spray coating), or other suitable textures for aesthetic and/or functional purposes. In some embodiments, an assortment of holders 104 are provided with different colors, such as black, white, gray, silver, blue, red, yellow, or other colors to provide the user with many aesthetic options.

Although primarily ornamental, the exterior shape of the holder 104 may provide an ergonomic benefit. In some embodiments, the exterior shape of the holder 104 may facilitate single-handed use of the remote control device 100 by a user, and/or enhance the aesthetic aspect of the holder 104 when not in use. Referring to FIGS. 1-3 and 8, the holder 104 is depicted as a laterally-extending body (in the plane of FIG. 1) having a front surface 108 and a rear surface 120, with a depth defined (in the plane of FIG. 2) between corresponding points of the front and rear surfaces 108, 120. The front surface 108 may include a linear or planar portion or rim 112 and a continuously curved portion extending rearwardly from the rim 112. The rear surface 120 may define a continuously curved portion. An outer perimeter edge 105 may be formed at the intersection of the continuously curved portions of the front and rear surfaces 108, 120, and may define a generally triangular shape with rounded vertices 107a, 107b, 107c. An external side wall of the holder 104 may be defined by side portions of the front and rear surfaces 108, 120 of the holder 104 (see FIG. 2), and may be defined as a continuous curve extending around the perimeter edge 105.

The triangularly-shaped holder 104 may comfortably fit in the palm of the user's hand for either right-handed or left-handed use, thereby facilitating one-handed use of the remote control device 100. For instance, with reference to FIG. 1, when held in a user's right hand, the vertex 107b may be adjacent the user's thumb, the vertex 107a may be adjacent the user's forefinger, and the vertex 107c may be adjacent the user's little finger. The rear surface 120 of the holder 104 may be positioned in the user's palm, and the user's fingers may wrap around the perimeter edge 105 toward the front surface 108 of the holder 104. When held in a user's left hand, the vertex 107a may be positioned between the user's thumb and forefinger, the vertex 107c may be adjacent the user's little finger, and the user's remaining fingers may be adjacent the vertex 107b.

The optional recessed nature of the control unit 102 within the holder 104 may increase the difficulty of removing the control unit 102 from the holder 104. With reference to FIGS. 1, 3, and 8-11, the holder 104 may include an access, engagement, or removal feature 114 to facilitate removal of the recessed control unit 102 from the holder 104. The access feature 114 may be defined in the front surface 108 of the holder 104. The access feature 114 may be formed as a recessed area 116 that extends at least partially along a periphery or portion of the control unit 102 and the cavity 106. In some embodiments, the recessed area 116 extends around the entire periphery of the control unit 102 and the cavity 106. The recessed area 116 may be defined by a recessed surface 118 that extends around the entire periphery of the control unit 102 and the cavity 106. The recessed surface 118 may extend rearwardly from the rim 112 towards a rear surface 120 of the holder 104, and may extend inwardly from the rim 112 towards side walls 122, 124 of the cavity 106 and the control unit 102, respectively. The recessed surface 118 may be formed as a chamfer, a cove, a rabbeting, a round over, or other suitable recessed profiles to facilitate removal of the control unit 102 from the holder 104.

With reference to FIGS. 1, 3, 8, and 11, the recessed area 116 may include an accessibility enhancing feature such as a deepened portion or notch 126 that extends along a portion of the control unit 102 and the cavity 106. The notch 126 may be defined in the recessed surface 118 and may extend towards and through the side wall 122 of the cavity 106 (see FIG. 11). The notch 126 may be deepest in a central region thereof, and tapered at the ends thereof. The central region of the notch 126 may extend through the side wall 122 of the cavity 106, and the ends of the notch 126 may smoothly transition into the recessed surface 118. The notch 126 may provide additional space between the control unit 102 and the holder 104 to facilitate removal of the control unit 102 from the holder 104 as described in further detail below.

Referring to FIGS. 3-7, the user interface 110 of the control unit 102 may be positioned along a front side of the control unit 102. The user interface 110 may include one or more interactive features 128 (such as one or more depressible buttons, touch screen surfaces, or other suitable interactive features). The interactive features 128 may include a centrally-located interactive feature 130, and one or more outer rings of interactive features arranged concentrically around the centrally-located feature 130. In some embodiments, the control unit 102 includes a ring of interactive features 132 arranged concentrically around the centrally-located interactive feature 130 and a curved segment of interactive features 134 arranged concentrically around the centrally-located interactive feature 130 and the ring of interactive features 132. The curved segment of interactive features 134 may be arranged along an outer peripheral portion of the user interface 110 and may, in conjunction with a portion of the unit intended for use in extracting the unit from the holder, surround the ring of interactive features 132 and the centrally-located interactive feature 130.

In some embodiments, an engagement feature 136 is positioned between terminal ends of the curved segment of interactive features 134. The engagement feature 136 may be formed as a curved segment defined by the same or substantially the same radius as the curved segment of interactive features 134, and may be substantially indistinguishable in appearance from the curved segment of interactive features 134. In some embodiments, the engagement feature 136 is fixedly attached to a housing 138 of the control unit 102 such that the engagement feature 136 is not movable relative to the housing 138. In some embodiments, the engagement feature 136 is inoperable to control an electronic device and is not associated with any electronic circuitry housed within the control unit 102. In some embodiments, the engagement feature 136 is formed as a dummy, inoperable, or non-functional button that is fixed to the housing 138.

Figure 20:
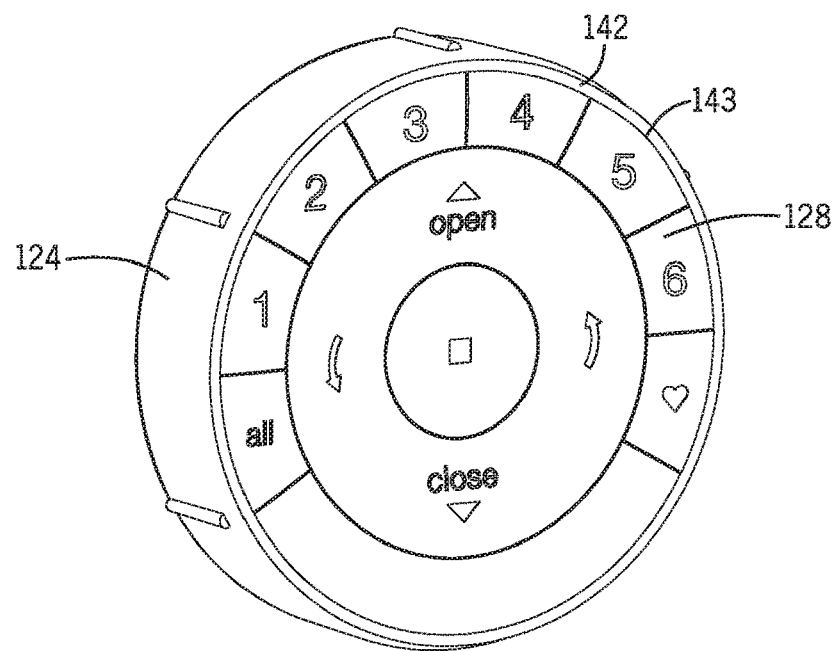
FIG. 20 is an elevational view of a control unit in accordance with some embodiments of the present disclosure.

Referring to FIGS. 4-6, the curved segment of interactive features 134 and the engagement feature 136 may be spaced forwardly of the side wall 124 of the control unit 102 and define a gap 139 between the interactive features 134 and engagement feature 136 and a front surface 142 of the side wall 124. The gap 139 may permit a user to depress one or more of the interactive features 134 and cause the one or more interactive features 134 to move toward the housing 138. Movement of the one or more interactive features 134 toward the housing 138 may cause the control unit 102 to generate a control signal and transmit the control signal from the control unit 102 to an associated electronic device to control the operation of the electronic device. The interactive features 134 may be formed as depressible buttons biased toward a non-depressed position and may move into the non-depressed position when not acted upon by an external force sufficient to overcome the bias. The gap 139 between the interactive features 134 and the side wall 124 and between the engagement feature 136 and the side wall 124 may be the same so that the interactive features 134 are substantially flush or coplanar with the engagement feature 136. In some embodiments, the peripheral edge of the interactive features 128 may be substantially aligned with an outer surface of the side wall 124 as illustrated in FIG. 6. In some embodiments, as illustrated in FIG. 20, the side wall 124 may surround the peripheral edge 143 of the interactive features 128 to inhibit the peripheral edge 143 of the interactive features 128 from being caught or snagged on another object. As shown in the illustrative embodiment of FIG. 20, the front surface 142 of the side wall 124 may be substantially flush with a front surface of the interactive buttons 128. In some embodiments, the peripheral edge 143 of the interactive features 128 may be recessed relative to the side wall 124 to protect the interactive features 128.

Figure 15:
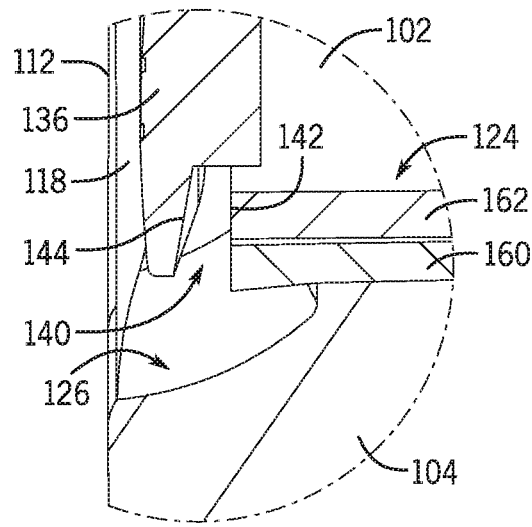
FIG. 15 is an enlarged, detail view of corresponding access and removal features of the remote control device of FIG. 1 taken along line 15-15 of FIG. 14 in accordance with some embodiments of the present disclosure.

Referring to FIGS. 4-6, the control unit 102 may include a removal feature to facilitate removal of the control unit 102 from the holder 104. The removal feature may include the engagement feature 136, the gap 139 defined between the engagement feature 136 and the front surface 142 of the side wall 124, or both. Referring to FIGS. 1 and 15, the engagement feature 136 may be aligned with the notch 126 to facilitate removal of the control unit 102 from the holder 104 when the control unit 102 is seated in the cavity 106 of the holder 104. The alignment of the engagement feature 136 with the notch 126 may provide the user with additional space around a portion of the periphery of the control unit 102 to remove the control unit 102 from the holder 104 as described in further detail below. The engagement feature 136 may be configured to withstand the force required to pry the control unit 102 from the holder 104.

Referring still to FIGS. 4-6, the engagement feature 136 may define a recess 140 that enlarges the gap 139 between the front surface 142 of the side wall 124 and a rear surface 144 of the engagement feature 136 to facilitate removal of the control unit 102 from the holder 104. As shown in FIG. 6, a portion of the rear surface 144 of the engagement feature 136 may be angled away from the front surface 142 of the side wall 124 as the rear surface 144 extends towards an outer edge of the engagement feature 136 to define the recess 140 and thereby to enlarge an entrance of the gap 139. The recess 140 may ease insertion of a user's fingertip or tool behind the rear surface 144 of the engagement feature 136 to facilitate removal of the control unit 102 from the holder 104.

Figure 13:
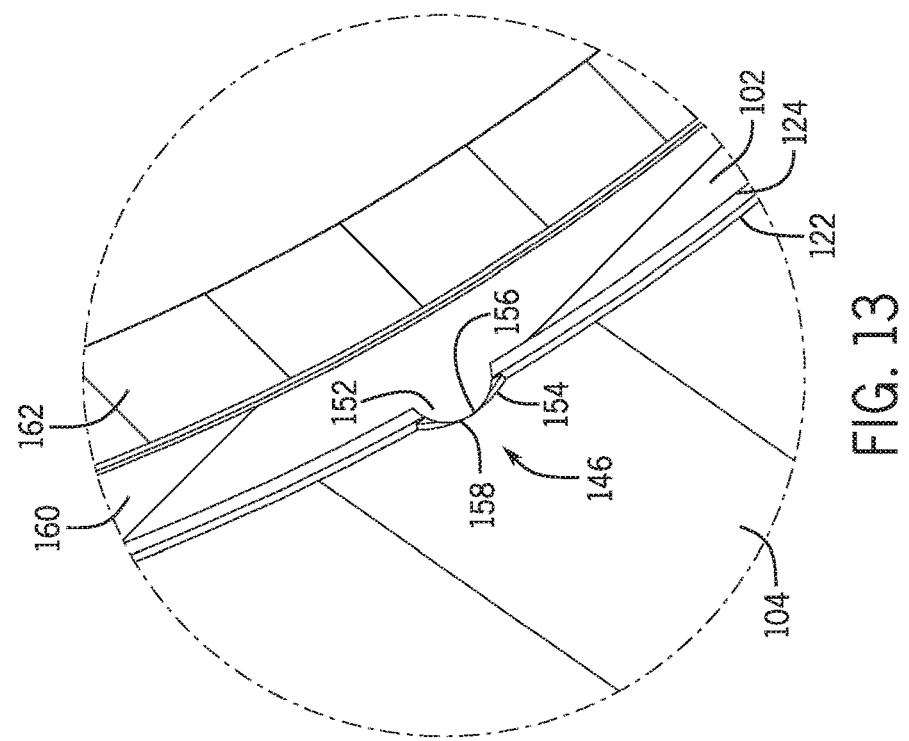
FIG. 13 is an enlarged, detail view of corresponding retention features of the remote control device of FIG. 1 taken along line 13-13 of FIG. 12 in accordance with some embodiments of the present disclosure.
Figure 12:
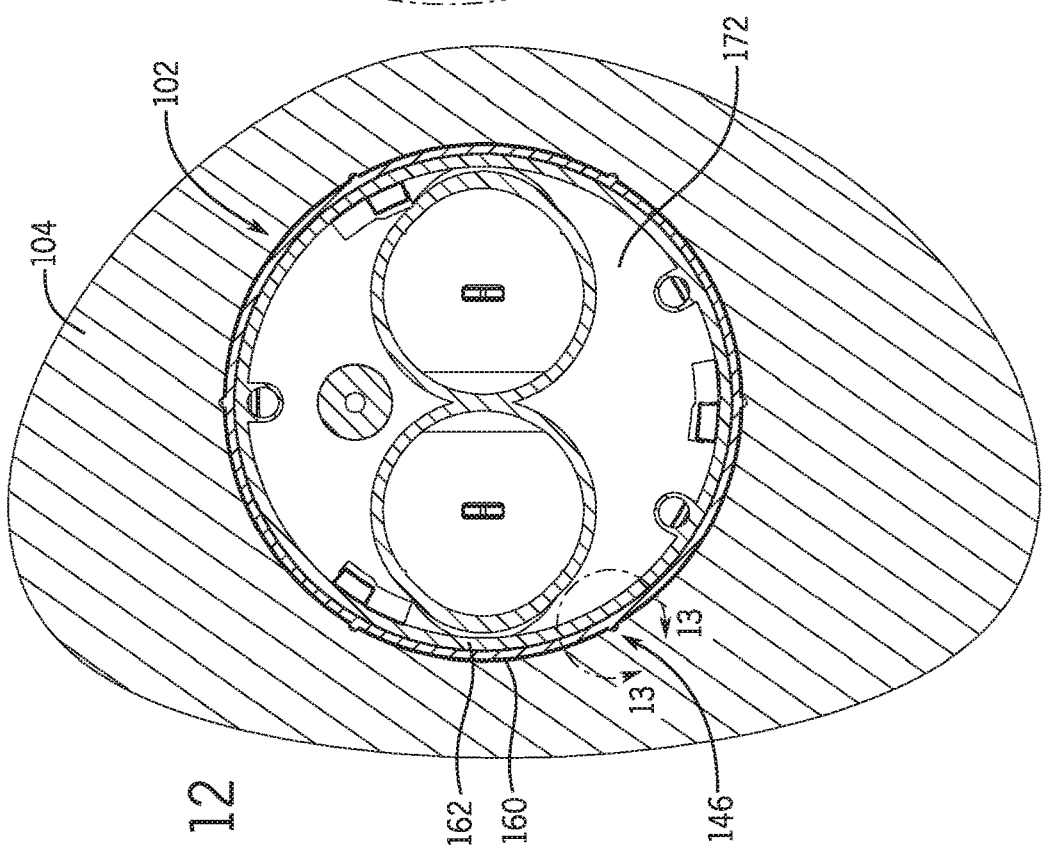
FIG. 12 is a cross-sectional view of the remote control device of FIG. 1 taken along line 12-12 of FIG. 2 in accordance with some embodiments of the present disclosure.

Referring to FIGS. 3, 12, and 13, the control unit 102 and the holder 104 may include corresponding retention features 146 for retaining the control unit 102 in the cavity 106 of the holder 104. In some embodiments, the retention features 146 are corresponding grooves and ribs. The control unit 102 may include either multiple ribs or grooves formed in the side wall 124. The ribs or grooves may extend lengthwise along and generally parallel to a longitudinal axis 148 of the control unit 102 (see FIG. 3). The holder 104 may include the other of multiple ribs or grooves, which may be formed in the side wall 126 of the holder 104 and may extend lengthwise along a longitudinal axis 150 of the cavity 106 or otherwise be oriented to cooperate with the ribs or grooves of the control unit 102. It will be appreciated that although the following description of ribs and grooves references ribs on the control unit 102 and grooves on the holder 104, the reverse arrangement, with ribs on the holder 104 and grooves on the control unit 102, is also within the scope of the present disclosure.

With reference to FIGS. 3-7, the control unit 102 may include multiple ribs 152 extending lengthwise along the longitudinal axis 148 of the control unit 102. The ribs 152 may project outwardly from the side wall 124, and may be equally spaced apart from one another around the side wall 124. However, it will be appreciated that other configurations are within the scope of the present disclosure, such as unequal spacing of the ribs 152 from one another. The ribs 152 may have a convex cross-sectional profile, such as an arcuate, or curved, or semi-circular, or half-dome convex cross-sectional profile.

With reference to FIGS. 3 and 9-11, the holder 104 may likewise include multiple grooves 154 extending lengthwise along the longitudinal axis 150 of the holder 104. The grooves 154 may be recessed into the side wall 122, and may be spaced apart from one another, equidistantly or not equidistantly, in the side wall 122. The grooves 154 may have a cross-sectional profile corresponding to the cross-sectional profile of the ribs 152, such as a concave cross-sectional profile, for example an arcuate, or curved, or semi-circular, or half-dome concave cross-sectional profile. In some embodiments, a single set of a corresponding rib 152 and groove 154 may have a different cross-sectional profile than the remaining ribs 152 and grooves 154 to provide a keying structure that ensures the engagement feature 136 is properly aligned with the notch 126 upon insertion of the control unit 102 into the holder 104.

Referring to FIGS. 12 and 13, the ribs 152 may have different cross-sectional profiles than the grooves 154. In some embodiments, the ribs 152 have a narrower width than the grooves 154 to facilitate insertion and removal of the control unit 102 into and from the holder 104 and to center the control unit 102 relative to the holder 104. The outer tip or apex 156 of the ribs 152 may engage a bottom 158 of the grooves 154 to frictionally secure the control unit 102 in the holder 104. The ribs 152 may be formed of a resilient material, such as an elastomeric material, that compresses upon insertion into the grooves 154 and provides an interference fit between the control unit 102 and the holder 104, and expands when uncompressed.

With continued reference to FIGS. 12 and 13, the ribs 152 may be formed as a unitary part of an outer layer 160 of the side wall 124. The ribs 152 and the outer layer 160 may be overmolded as a single structure onto an inner layer 162 of the side wall 124. The inner layer 162 may be formed of a rigid material to provide rigidity to the side wall 124, whereas the outer layer 160 may be formed of a resilient material to enhance retention of the control unit 102 in the holder 104 and to provide shock protection to the control unit 102. The resilient outer layer 160 may enhance grippage of the control unit 102 when the control unit 102 is removed from the holder 104. In some embodiments, the outer layer 160 is formed of an elastomeric material, such as a thermoplastic elastomer.

Figure 14:
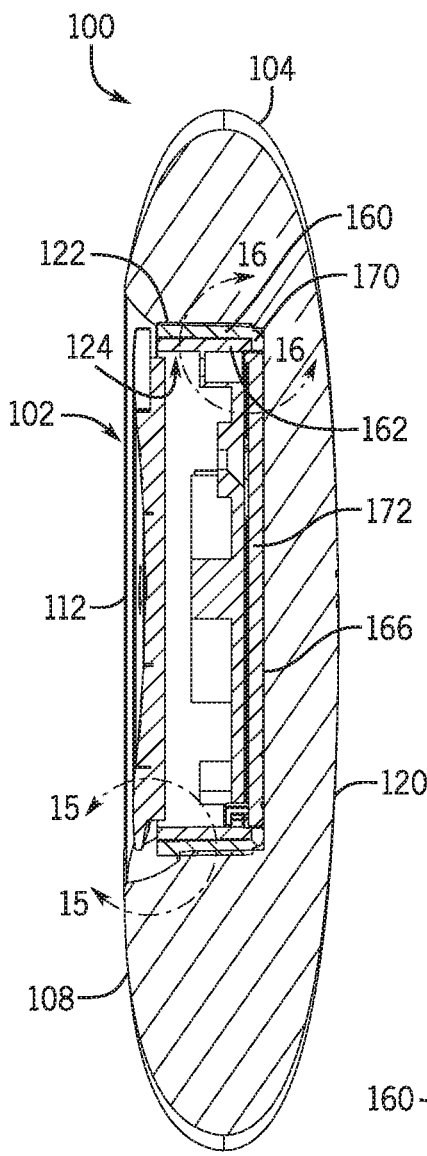
FIG. 14 is a cross-sectional view of the remote control device of FIG. 1 taken along line 14-14 of FIG. 1 in accordance with some embodiments of the present disclosure.
Figure 16:
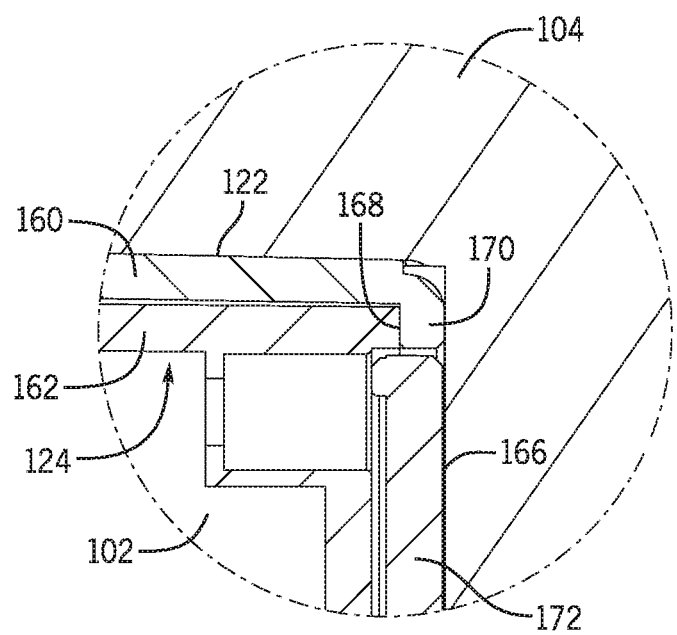
FIG. 16 is an enlarged, detail view of an interface between the control unit of FIG. 4 and the holder of FIG. 8 taken along line 16-16 of FIG. 14 in accordance with some embodiments of the present disclosure.

The outer layer 160 of the control unit 102 may contact the side wall 122 and an inner wall 166 (defining a bottom of the cavity 106) of the holder 104 to provide shock protection for the control unit 102 when it is seated in the holder 104. Referring to FIGS. 14 and 16, the outer layer 160 may extend beyond a rear surface 168 of the inner layer 162. In some embodiments, the outer layer 160 wraps around the rear surface 168 of the inner layer 162 and forms a rim 170 of resilient material around the rear surface of the control unit 102. When the control unit 102 is seated in the holder 104, the rim 170 of the control unit 102 may contact the inner wall 166 of the holder 104 to define a fully seated configuration. In the fully seated configuration, the side wall 124 of the control unit 102 may be spaced apart from (e.g., not in contact with) the side wall 122 of the holder 104 (see FIG. 13). In this fully seated configuration, the ribs 152 may be seated in the grooves 154 to secure the control unit 102 in the cavity 106 of the holder 104.

Figure 21:
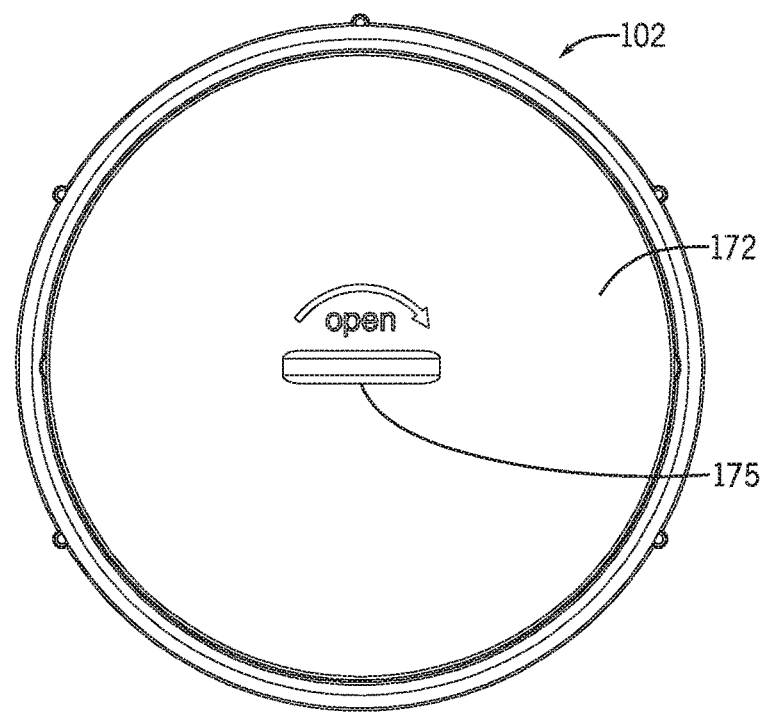
FIG. 21 is a rear view of a control unit in accordance with some embodiments of the present disclosure.

Referring to FIGS. 7, 12, 14, and 16, the control unit 102 may include a removable rear cover 172. The rear cover 172 may be received on a rear side of the control unit 102 inwardly of the rim 170 of the outer layer 160 of the side wall 124. The rear cover 172 may be recessed relative to the rim 170 so that the rim 170 projects rearwardly of the rear cover 172 and contacts the inner wall 166 when the control unit 102 is seated in the holder 104. The rear cover 172 may enclose a rear side of the control unit 102 and, when removed, may provide access to one or more batteries, communication circuitry, or both of the control unit 102. A movable latch 174 may be coupled to the rear cover 172 to selectively attach or detach the rear cover 172 to or from the control unit 102. The latch 174 may be movable between an open position where the latch 174 is disengaged from the inner layer 162 of the side wall 124 and permits removal of the rear cover 172 from the control unit 102 and a closed position where the latch 174 is engaged with the inner layer 162 and prevents removal of the rear cover 172 from the control unit 102. In some embodiments, the latch 174 is slidable between the open and closed positions. Additionally or alternatively, as illustrated in FIG. 21, the rear cover 172 may define a battery access feature, such as recess 175, for facilitating removal of the rear cover 172 from the control unit 102. The recess 175 may be dimensioned to receive a coin for turning the rear cover 172 relative to the control unit 102 to disengage the rear cover 172 from the control unit 102.

Referring to FIGS. 3-9, 12, and 14, the control unit 102 and the cavity 106 of the holder 104 may have complementary shapes. In some embodiments, the control unit 102 has a substantially cylindrical shape. For example, the side wall 124 of the control unit 102 may be cylindrical or substantially cylindrical and may be coaxially aligned along the longitudinal axis 148 of the control unit 102. In these embodiments, the cavity 106 may be formed as an open-ended cylinder. For example, the side wall 122 defining a depth of the cavity 106 may be cylindrical or substantially cylindrical, and the inner wall 166 may be oriented perpendicular or substantially perpendicular to the side wall 122 and may define a closed bottom of the cavity 106. The cavity 106 may include an open end opposite the inner wall 166 for ingress and egress of the control unit 102. The side walls 122, 124 may have a slight draft angle to facilitate insertion and removal of the control unit 102 into and from the cavity 106. Although not shown, it should be understood the control unit 102 and the cavity 106 may be formed in complementary shapes other than cylindrical. For example, the side walls 122, 124 of the cavity 106 and the control unit 102 may be formed in various polygonal shapes, such as triangular, rectangular, octagonal, irregular, or other suitable shapes. The holder 104 may be formed of various materials, including metallic and/or non-metallic materials, which may be man-made or natural. In some embodiments, the holder 104 is formed of a polymeric material, such as acrylonitrile butadiene styrene (ABS) or Surlyn (a copolymer of ethylene and methacrylic acid).

To assemble the remote control device 100, the control unit 102 may be positioned forwardly of the cavity 106 adjacent the front surface 108 of the holder 104. The control unit 102 may be moved laterally into alignment with the cavity 106 such that the longitudinal axis 148 of the control unit 102 is coaxially aligned with the longitudinal axis 150 of the cavity 106. The control unit 102 may be rotated about its longitudinal axis 148 to align the corresponding retention features 146, if provided, of the control unit 102 and the holder 104. The control unit 102 then may be inserted into the cavity 106 by moving the control unit 102 towards the holder 104 along the longitudinal axis 150 of the holder 104 such that the corresponding retention features 146 of the control unit 102 and the holder 104 engage one another to retain the control unit 102 within the cavity 106 of the holder 104. The retention features 146 of the control unit 102 may be formed as ribs 152 projecting outwardly from the side wall 124 of the control unit 102. The ribs 152 may be spaced apart from one another around the side wall 124. The retention features 146 of the holder 104 may be formed as grooves 154 defined in the side wall 122. The grooves 154 may be spaced apart from one another around the side wall 122 at corresponding locations to the ribs 152. The ribs 152 and grooves 154 may be spaced regularly or irregularly around the respective side walls 124, 122 to control alignment of the control unit 102 and the holder 104 and ensure the engagement feature 136 corresponds to the notch 126.

The control unit 102 may be inserted into the cavity 106 until the control unit 102 is recessed relative to the front surface 108 of the holder 104. Upon full insertion of the control unit 102 in to the holder 104, a rim 170 of resilient material formed along a rear side of the control unit 102 may contact a bottom of the cavity 106, formed by the inner wall 166. In some embodiments, only the ribs 152 and the rim 170 of the control unit 102 are in contact with the holder 104 when the control unit 102 is fully seated in the holder 104. The side wall 124 of the control unit 102 may be spaced radially inwardly from the side wall 122 of the holder 104, and the rear cover 172 of the control unit 102 may be spaced forwardly of the inner wall 166.

Prior to inserting the control unit 102 into the cavity 106, the optional engagement feature 136, such as a non-operative button, of the control unit 102 may be aligned with a corresponding optional notch 126 formed circumferentially adjacent the cavity 106 of the holder 104. To remove the control unit 102 from the cavity 106 of the holder 104, the user may place one or more of their finger nails or a suitable tool in the recessed area 116, grip or otherwise engage the side wall 124 or the underside of the engagement feature 136 of the control unit 102, and pull or pry the control unit 102 from the cavity 106. The user may use a pry tool (such as a file, screwdriver, or other object with an elongate, slender tip) to pry the control unit 102 from the cavity 106 in the same or similar manner, such as by positioning the tip of the tool through the notch 126 in the holder 104 and into the gap 139, and then applying a forwardly-directed force to the engagement feature 136 to unseat the control unit 102 from the holder 104. In some embodiments, the user may position an end of the tool in the notch 126, press the tool end against the side wall 124 or the engagement feature 136 of the control unit 102, and subsequently apply a rearwardly-directed force to a free end of the tool to pry the control unit 102 from the cavity 106 in a forwardly direction.

Figure 17:
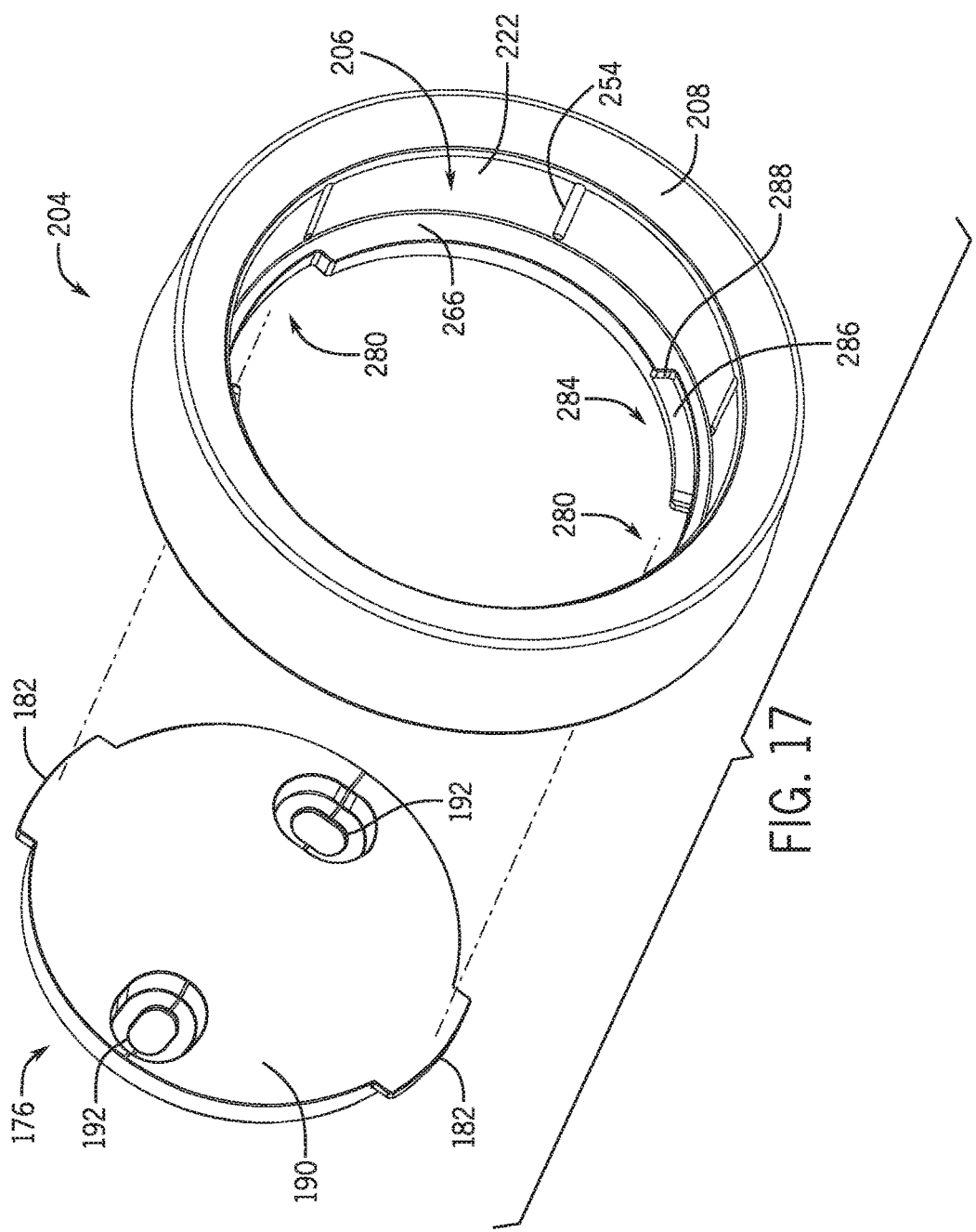
FIG. 17 is an exploded, front isometric view of an alternative holder and a wall mount in accordance with some embodiments of the present disclosure.
Figure 18:
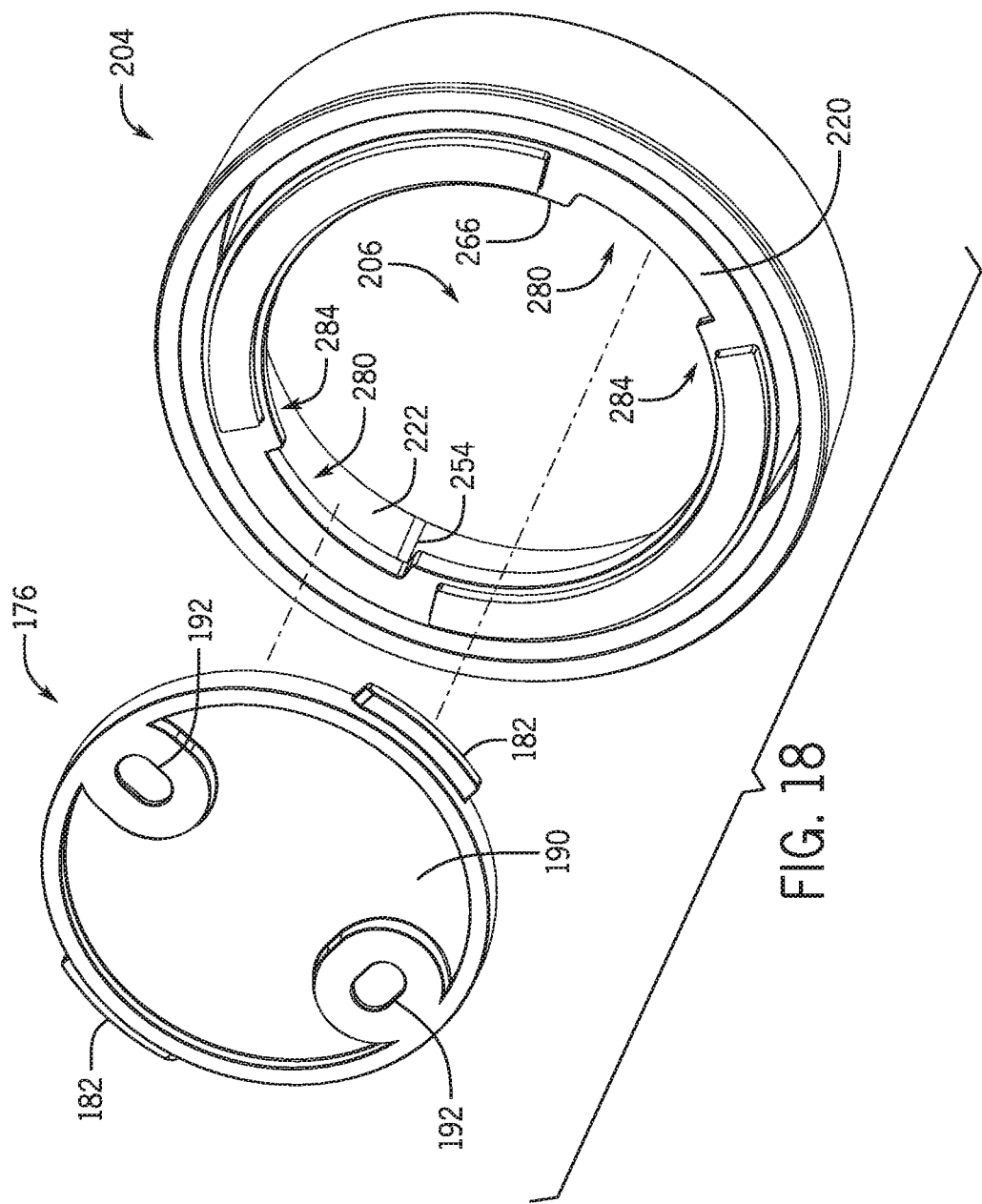
FIG. 18 is another exploded, rear isometric view of the alternative holder and the wall mount of FIG. 17 in accordance with some embodiments of the present disclosure.
Figure 19:
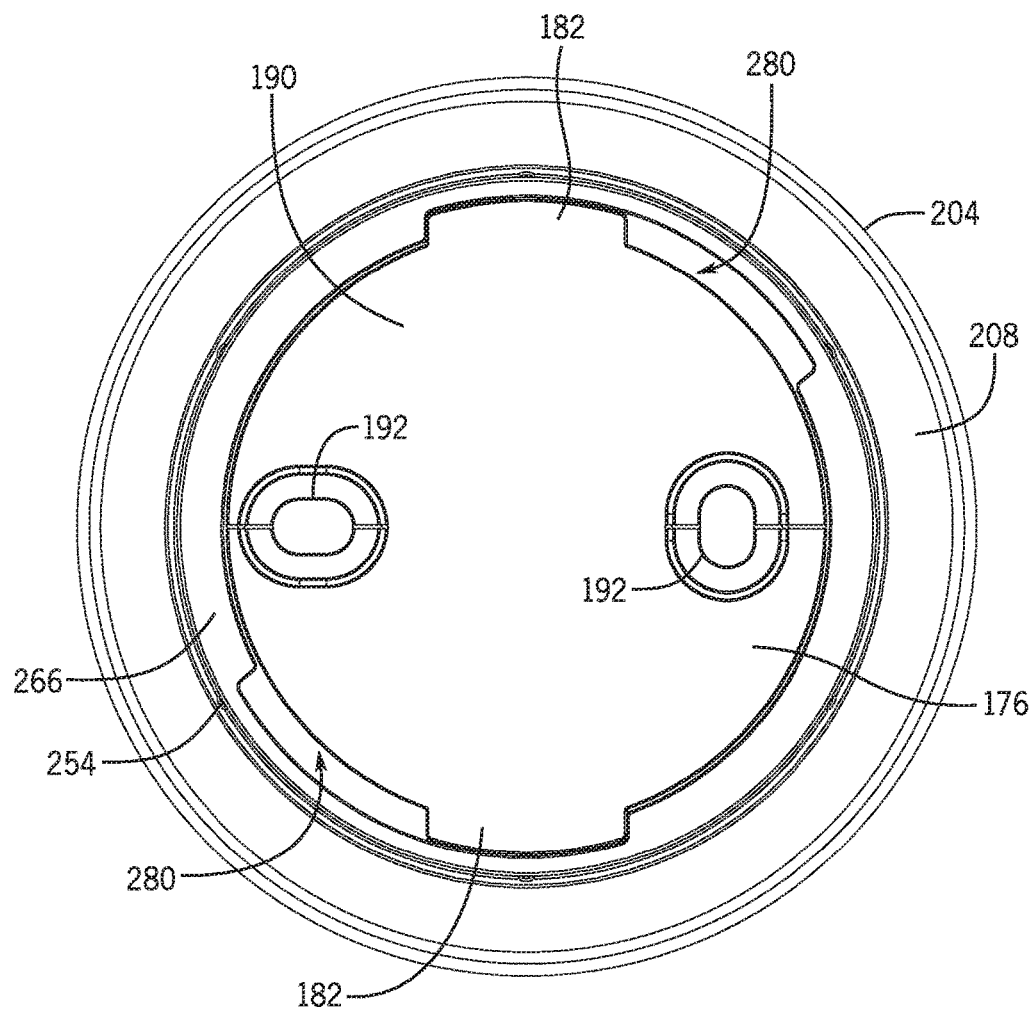
FIG. 19 is a front view of the alternative holder and the wall mount of FIG. 17 in accordance with some embodiments of the present disclosure.

Referring to FIGS. 17-19, an alternative holder 204 that may be used with the control unit 102 is depicted. In some embodiments, the holder 204 is configured to be mounted to a support surface, whereas the holder 104 is configured to not be mounted to a support surface. The preceding discussion of the features and operation of the holder 104 should be considered equally applicable to the holder 204, except as noted in the following discussion pertaining to the holder 204. The reference numerals used in FIGS. 17-19 correspond to the reference numerals used in FIGS. 1-16 but are increased by 100 to reflect similar parts and components.

With continued reference to FIGS. 17-19, the holder 204 may be formed in the shape of a ring with an internal side wall 222 defining a cavity 206 sized to receive the control unit 102. The cavity 206 may be open-ended, and may open through a front surface 208 and a rear surface 220 of the holder 204. An inner rim wall 266 may extend inwardly from the side wall 222 near the rear surface 220 of the holder 204 to serve as an abutment wall for the control unit 102 to abut against when inserted into the holder 204 from a front side of the holder 204 so that the control unit 102 is not inadvertently pushed through and out of the holder 204.

When seated in the holder 204, the control unit 102 may be recessed relative to the front surface 208 of the holder 204, similar to when the control unit 102 is seated in the holder 104 (see FIGS. 1-3, 14, and 15). To retain the control unit 102 in the holder 204, the external ribs 152 of the control unit 102 may be received in internal grooves 254 of the holder 204. The rim 170 of the control unit 102 may abut against the inner rim wall 266, and the rear cover 172 of the control unit 102 may be accessible from a rear side of the holder 204. In some embodiments, the rear cover 172 may be removed from the control unit 102 when the control unit 102 is seated in the holder 204. To remove the control unit 102 from the holder 204, a user may grasp the holder 204 and press on the rear surface of the control unit 102 to push the control unit 102 forwardly out of the holder 204.

Referring to FIGS. 17-19, the holder 204 may be removably attached to a wall mount 176 to facilitate securing of the holder 204 to a support surface such as a vertical support surface, for example a wall. In the illustrated embodiment, the holder 204 has not only an open front surface (for mounting of the control unit therethrough), but also an open rear surface to facilitate mounting of the holder 204 onto the wall mount 176. The holder 204 may include a pair of axially-extending channels 280 defined in the inner rim wall 266 and sized to permit passage of a pair of ears 182 of the wall mount 176. The channels 280 may be defined in the inner rim wall 266 diametrically opposite one another or in another relative orientation with respect to one another. A pair of seats 284 may be defined in the inner rim wall 266 and adapted to receive the ears 182 of the wall mount 176 to attach the holder 204 to the wall mount 176. The seats 284 may be angularly offset from the channels 280 and may be formed in a front surface of the inner rim wall 266. The seats 284 may be defined by a sloped wall 286 extending tangentially around the cavity 206 toward a stop 288. The attachment features of the holder 204 and the wall mount 176 may form a bayonet mount.

With continued reference to FIGS. 17-19, the wall mount 176 may be formed as a circular disc or plate. The wall mount 176 may include a body 190, and the ears 182 may project radially outwardly from the body 190. The body 190 may be sized to fit inside the inner rim wall 266, with the ears 182 sized to pass through the channels 280 and be rotated onto the seats 284. The ears 182 and the seats 284 may have a combined thickness approximately equal to the thickness of the inner rim wall 266 so that when the holder 204 is attached to the wall mount 176, a front surface of the ears 182 is substantially flush or coplanar with a front surface of the inner rim wall 266.

Referring still to FIGS. 17-19, the wall mount 176 may be attachable to a support surface such as a substantially vertical support surface, for example a vertical wall. The wall mount 176 may include two or more apertures 192 defined in the body 190 of the wall mount 176. Each aperture 192 may be configured to receive a fastener, such as a screw, to securely attach the wall mount 176 to the support surface. The fasteners may be extended through the apertures 192 and secured to the support surface, thereby fastening the wall mount 176 to the support surface.

The holder 204 may attach the control unit 102 to a support surface such as a substantially vertical support surface, for example a vertical wall. In some embodiments, the holder 204 is removably attached to the wall mount 176, and the control unit 102 optionally is removably attached to the holder 204. As previously discussed, the wall mount 176 may be securely fastened to a support surface. In the mounted configuration, the ears 182 may be offset from the support surface. To attach the holder 204 to the wall mount 176, the holder 204 may be positioned in front of the wall mount 176. The holder 204 may be rotated about its longitudinal axis until the channels 280 are aligned with the ears 182 of the wall mount 176, and the holder 204 may be moved axially towards the wall mount 176. Upon the ears 182 passing through the channels 280, the holder 204 may be rotated about its longitudinal axis to slide the ears 182 along the sloped surfaces 286 and into the seats 284. The ears 182 may contact the stops 288 to indicate the holder 204 is secured to the wall mount 176. In this secured configuration, the seats 284 may be positioned between the ears 182 and the support surface.

To detach the holder 204 from the wall mount 176, the holder 204 may be rotated in an opposite direction about its longitudinal axis to align the channels 280 with the ears 182, and then the holder 204 may be moved axially away from the wall mount 176 to move the ears 182 through the channels 280 and free the holder 204 from the wall mount 176. The control unit 102 may be housed within the holder 204 during attachment and detachment of the holder 204 to and from the wall mount 176, or placed into the holder 204 after the holder 204 has been attached to the wall mount 176.

It will be appreciated that a remote control device formed in accordance with principles of the present disclosure such as described above may provide a user with multiple holders configured to receive a single control unit. The holders may be interchanged with one another to provide the user with different aesthetics, functionality, or both. The holders may be configured to attach the control unit to a support surface and/or to support, yet not attach, the control unit to a support surface. Additionally, or alternatively, the holders may be configured to conceal the control unit when supported by, yet not necessarily attached to, a support surface, such as a table. The holders may be formed to display the control unit to provide access thereto, such as when attached to a surface, which may be a vertical support surface such as a wall. The holders may be formed as independent, unitary structures.

In some embodiments, one or more holders enclose or surround the side surfaces of the control unit, leaving the front surface of the control unit exposed. The control unit, when mounted in the holder, may be recessed relative to the front surface of the holder, such as to protect the front surface of the control unit, for example when the holder is supported face-down on a support surface. A user may remove the control unit from the holder by applying a force to a rear surface of the control unit to push the control unit forwardly through the opening in the front surface of the holder, particularly if the rear surface of the control unit is not covered or otherwise rendered inaccessible (or not readily accessible) by the presence of the holder. The holder may be configured to facilitate removal of the control unit from the front face of the holder. To facilitate removal of the control unit from the front of the holder, the holder may include a recessed area disposed around a perimeter of the control unit. The control unit may include a dummy button or other engagement feature that is alignable with a deepened portion of the recessed area for engagement by a user and/or tool to facilitate removal of the control unit from the holder.

The foregoing description has broad application. While the provided embodiments include a substantially circular-cross-section, cylindrically-shaped control unit, it should be appreciated that the concepts disclosed herein may equally apply to many shapes of control units, for example shapes with elliptical or polygonal cross-sections. Additionally, or alternatively, while the provided embodiments generally include a control unit with depressible buttons, it should be appreciated that the control unit may include an electronic user interface with non-depressible buttons. Additionally, or alternatively, the remote control device may be applicable in controlling many different types of electronic equipment, including coverings for an architectural opening. Accordingly, the discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation.

The term "a" or "an" entity, as used herein, refers to one or more of that entity. As such, the terms "a" (or "an"), "one or more" and "at least one" can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order, and relative sizes reflected in the drawings attached hereto may vary.

What is claimed is:

1. A remote control device comprising:
   a control unit; and
   a holder including a cavity, the control unit is configured for insertion into the cavity of the holder;
   wherein the control unit and the cavity formed in the holder have complementary shapes, the control unit includes control unit retention features and a side wall of the cavity formed in the holder includes corresponding holder retention features, each of the control unit retention features being contoured to engage with one of the holder retention features to prevent relative rotation of the control unit and the holder when the control unit is seated within the cavity of the holder and the corresponding control unit and holder retention features are engaged with each other; and
   wherein the holder has an asymmetrical ergonomically exterior shape arranged and configured to facilitate single-handed use of the remote control device.

2. The remote control device of claim 1, wherein the control unit retention features include one of a plurality of ribs or a plurality of grooves formed in a side wall of the control unit, and wherein the plurality of ribs or grooves extend lengthwise along a longitudinal axis of the control unit.

3. The remote control device of claim 2, wherein the holder retention features includes the other one of the plurality of ribs or the plurality of grooves, and extend lengthwise along a longitudinal axis of the cavity.

4. The remote control device of claim 3, wherein the plurality of ribs have a narrower width than the plurality of grooves.

5. The remote control device of claim 1, wherein:
   the control unit has an exterior side wall; and
   the cavity has an interior side wall, the exterior side wall of the control unit and the interior side wall of the cavity have complementary circular shapes to enable relative rotation between the control unit and the cavity formed in the holder prior to engagement of the corresponding control unit and holder retention features.

6. The remote control device of claim 1, wherein the control unit has a first exterior shape different from the asymmetrical exterior shape of the holder.

7. The remote control device of claim 6, wherein the asymmetrical exterior shape of the holder is non-circular.

8. The remote control device of claim 6, wherein the asymmetrical exterior shape of the holder is a triangular shape with rounded edges.

9. The remote control device of claim 8, wherein the triangularly-shaped holder is arranged and configured to fit in a palm of a user's hand for either right-handed or left-handed use.

10. The remote control device of claim 1, wherein the control unit includes a front surface and a rear surface, the front surface including a rim and a continuously curved portion extending rearwardly from said rim.

11. The remote control device of claim 10, wherein the rear surface includes a continuously curved portion.

12. The remote control device of claim 1, wherein the holder includes an inner wall extending across the cavity to define a closed bottom end of the cavity.

13. A method of assembling a remote control device including a control unit and a holder including a cavity, the method comprising:
- aligning the control unit with the cavity formed in the holder so that the control unit is orientated in a desired position relative to the cavity formed in the holder; and
- inserting the control unit into the cavity formed in the holder to engage control unit retention features with holder retention features to retain the control unit within the cavity of the holder;
- wherein engagement of the control unit retention features with the holder retention features prevent relative rotation of the control unit with respect to the holder; and
- wherein the holder has an asymmetrical exterior shape.

14. The method of claim 13, wherein the control unit retention features include one of a plurality of ribs or a plurality of grooves formed in a side wall of the control unit, and the holder retention features include the other one of the plurality of ribs or the plurality of grooves formed in the cavity of the holder.

15. The method of claim 13, wherein the control unit and the cavity formed in the holder have complementary circular or cylindrical shapes.

16. The method of claim 13, wherein the control unit includes a first exterior shape different from the asymmetrical exterior shape of the holder.

17. The method of claim 16, wherein the second exterior shape of the holder is a triangular shape with rounded edges.

18. The method of claim 16, wherein the asymmetrical exterior shape of the holder is ergonomically shaped to facilitate single-handed use of the remote control device.

* * * * *